United States Patent
Yoon et al.

(10) Patent No.: US 9,806,760 B2
(45) Date of Patent: Oct. 31, 2017

(54) ACQUISITION METHOD FOR PSEUDO NOISE CODE AT RECEIVER AND RECEIVER FOR ACQUIRING PSEUDO NOISE CODE

(71) Applicant: RESEARCH & BUSINESS FOUNDATION SUNGKYUNKWAN UNIVERSITY, Suwon-si (KR)

(72) Inventors: Seokho Yoon, Suwon-si (KR); Keunhong Chae, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 0 days.

(21) Appl. No.: 15/398,008

(22) Filed: Jan. 4, 2017

(65) Prior Publication Data

US 2017/0195007 A1    Jul. 6, 2017

(30) Foreign Application Priority Data

Jan. 4, 2016    (KR) .................. 10-2016-0000415

(51) Int. Cl.
| | | |
|---|---|---|
| *H04B 1/02* | (2006.01) | |
| *H04B 1/7073* | (2011.01) | |
| *H04B 1/16* | (2006.01) | |
| *H04B 17/20* | (2015.01) | |

(52) U.S. Cl.
CPC .............. *H04B 1/7073* (2013.01); *H04B 1/16* (2013.01); *H04B 17/20* (2015.01)

(58) Field of Classification Search
CPC ......... H04B 1/7073; H04B 1/16; H04B 17/20
See application file for complete search history.

(56) References Cited

U.S. PATENT DOCUMENTS

| | | | | |
|---|---|---|---|---|
| 2004/0205095 A1* | 10/2004 | Gressel | .................. | G06F 7/582 708/253 |
| 2008/0270501 A1* | 10/2008 | Fujita | ..................... | G06F 7/588 708/251 |
| 2010/0161696 A1* | 6/2010 | Matsui | .................... | G06F 7/588 708/209 |
| 2011/0131459 A1* | 6/2011 | Tu | ....................... | G06F 11/1068 714/746 |

* cited by examiner

*Primary Examiner* — Dac Ha
(74) *Attorney, Agent, or Firm* — NSIP Law

(57) ABSTRACT

The method includes converting, by the receiver, an input signal into a return-to-zero (RZ) signal, generating, by the receiver, a first summation signal by performing an exclusive-or (XOR) operation on the RZ signal and a delayed signal obtained by delaying the RZ signal by a reference time, collecting, by the receiver, n-length seed codes from the first summation signal, generating, by the receiver, a PN code based on the seed codes, and generating, by the receiver, a second summation signal by performing an XOR operation on the PN code and the delayed signal.

10 Claims, 4 Drawing Sheets

ACQUISITION METHOD FOR PSEUDO NOISE CODE AT RECEIVER AND RECEIVER FOR ACQUIRING PSEUDO NOISE CODE

CROSS-REFERENCE TO RELATED APPLICATION

This application claims the benefit under 35 USC 119(a) of Korean Patent Application No. 10-2016-0000415 filed on Jan. 4, 2016 in the Korean Intellectual Property Office, the entire disclosure of which is incorporated herein by reference for all purposes.

BACKGROUND

1. Field of the Invention

The following description relates to a technique for acquiring a pseudo noise (PN) code at a receiver.

2. Discussion of Related Art

In a direct-sequence spread spectrum (DSSS) system, a transmitter transmits a pseudo noise (PN) code that enables a signal to spread over a broad spectrum band, and a receiver has a PN code having the same sequence of the PN code in the transmitter as a local code to receive the transmitted PN code. It is important to synchronize the local code with the received code in order to receive data in the transmitter and the receiver. Techniques for fast acquisition of the PN code at a receiver have been developed. Representatively, there is a sequential estimation (SE) technique.

SUMMARY OF THE INVENTION

In one general aspect, there is provided a method of acquiring a PN code at a receiver, wherein the method includes converting, by the receiver, an input signal into a return-to-zero (RZ) signal, generating, by the receiver, a first summation signal by performing an exclusive-or (XOR) operation on the RZ signal and a delayed signal obtained by delaying the RZ signal by a reference time, collecting, by the receiver, n-length seed codes from the first summation signal, generating, by the receiver, a PN code based on the seed codes, and generating, by the receiver, a second summation signal by performing an XOR operation on the PN code and the delayed signal.

In another general aspect, there is provided a receiver for acquiring a PN code, wherein the receiver includes a first converter configured to convert an input signal input to the receiver into an RZ signal, a delayer configured to generate a delayed signal by delaying the RZ signal by a reference time, a first summer configured to perform an XOR operation on the RZ signal and the delayed signal, a seed estimator configured to collect n-length seed codes from an output signal of the first summer, a PN code generator configured to generate a PN code based on the seed codes, and a second summer configured to perform an XOR operation on the delayed signal and the PN code.

DETAILED DESCRIPTION OF EXEMPLARY EMBODIMENTS

Figure 1:
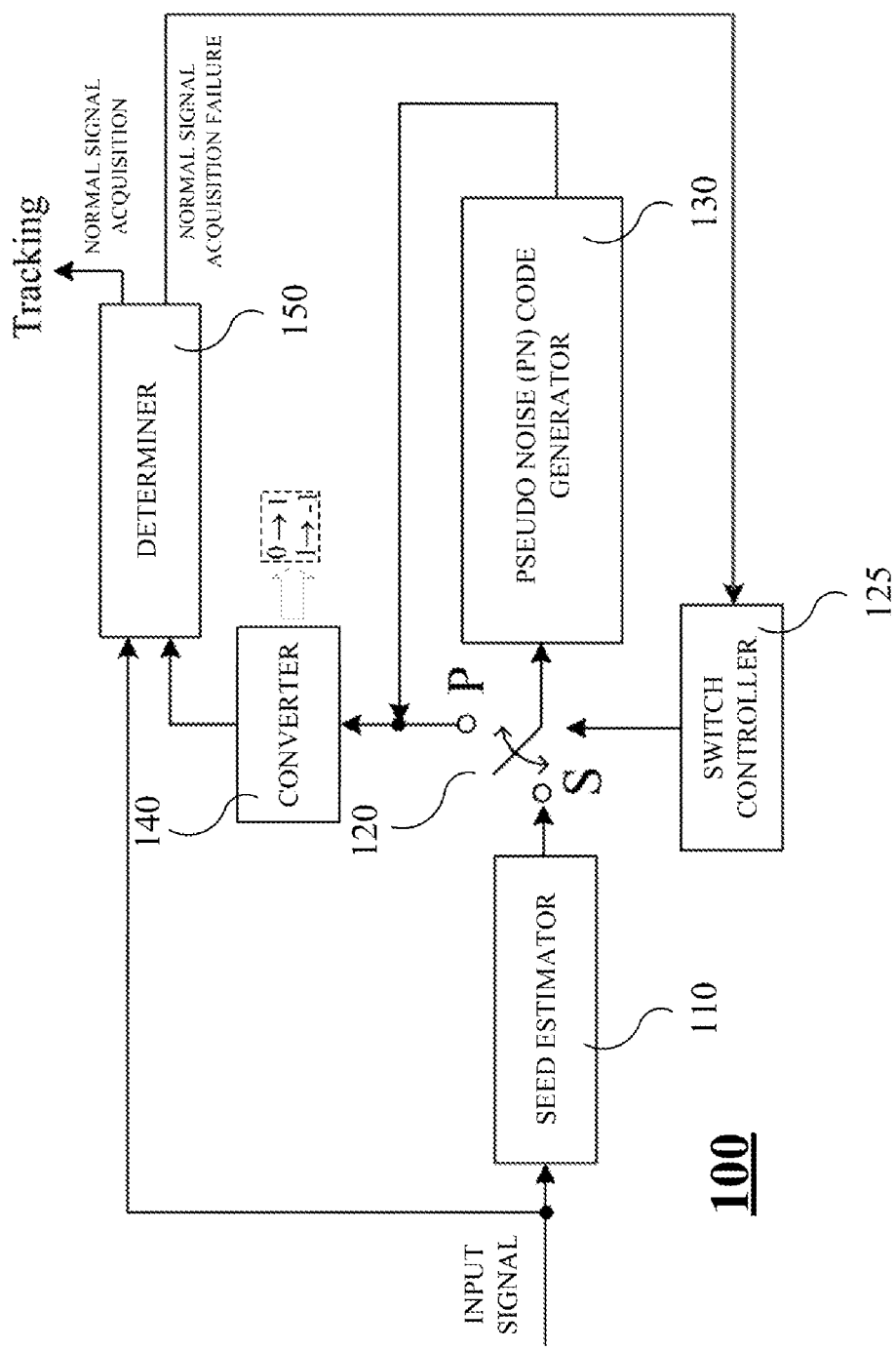
FIG. 1 illustrates an example of a receiver using a sequential estimation (SE) technique.

While the technique described below can be modified in various ways and take on various alternative forms, specific embodiments thereof are illustrated in the drawings and described in detail below as examples. However, there is no intent to limit the technique described below to the particular forms disclosed. On the contrary, it should be understood that the present invention covers all modifications, equivalents, and alternatives falling within the spirit and scope of the technique described below.

Although the terms "first," "second," etc. may be used herein to describe various elements, these elements are not limited by these terms. These terms are only used to distinguish one element from another. For example, a first element could be termed a second element, and, similarly, a second element could be termed a first element, without departing from the scope of the technique described below. As used herein, the term "and/or" includes any and all combinations of one or more of the associated listed items.

As used herein, the singular forms "a" and "an" should be understood as including the plural forms as well unless context clearly indicates otherwise. It should be further understood that the terms "comprise," "comprising," "include," and/or "including" signifies the presence of stated features, integers, steps, operations, elements, and/or components when used herein, but do not preclude the presence or addition of one or more other features, integers, steps, operations, elements, components, and/or groups thereof.

Before describing the drawings in detail, it should be clarified that components in this specification are merely divided by each main function of each component. That is, two or more components to be described below may be integrated into one component, or one component may be divided into two or more components by a more finely divided function. Each of components to be described below may additionally perform some or all of functions of another component in addition to its main function, and some of the main functions of each of the components may also be performed entirely by another component.

In addition, in performing of a method or an operation method, each of processes constituting the above method may be performed in a different order from the specified order unless a specific order is clearly indicated by context. That is, respective processes may be performed in the same order as, performed substantially at the same time as, or performed in an order opposite to the specified order.

A direct-sequence spread spectrum (DSSS) system uses a spread spectrum modulation technique used to spread a signal to be transmitted by multiplying (by performing an exclusive-or (XOR) operation) the signal by a digital signal (a spreading code) having a high frequency. A DSSS technique is used in the code division multiple access (CDMA) method, the Institute of Electrical and Electronics Engineers (IEEE) 802.11b specification used in Wi-Fi networks, the global positioning system (GPS), and the like. In the DSSS technique, data is modulated by using a pseudo noise (PN) code which is a bit stream. The PN code is also referred to as a pseudo random noise (PRN) code. The PN code may have various sequences and lengths according to a method of arranging shift registers. As a length of the PN code is increased, a correlation gain is increased. Therefore, a PN code having a long length is advantageous for signal acquisition. However, since candidate points to be searched for are increased as the length of the PN code is increased, there is a problem in that a mean acquisition time (MAT) is increased. A sequential estimation (SE) technique (hereinafter referred to as an SE technique) has been developed in order to address this problem.

The SE technique is based on a principle that, when a length of a PN code is defined as $2^n-1$ and a sequence of any n-length codes of any part of the PN code may be accurately identified, the remaining codes thereof may be generated. That is, when a receiver accurately estimates only the n-length codes of the PN code, the receiver may also accurately acquire the remaining codes thereof.

FIG. 1 illustrates an example of a receiver 100 using a sequential estimation (SE) technique. There are various improved techniques based on the SE technique. FIG. 1 is an example illustrating the most basic structure in the SE technique. It is assumed that a signal received by the receiver 100 is a non-return-to-zero (NRZ) signal and the signal is affected by Gaussian noise in a channel in order to assume a realistic case.

In FIG. 1, a signal input to a seed estimator 110 is a constantly modulated digital signal. The seed estimator 110 collects n-length codes in chips and estimates values of the chips. It is assumed that the number L of chips of a PN code in one cycle is $2^n-1$. The n-length codes in chips collected by the seed estimator 110 are hereinafter referred to as seed codes.

When a switch 120 is positioned at a position S, outputs (the seed codes) of the seed estimator 110 are accumulated on a register of a PN code generator 130. When the accumulation is completed, the switch 120 moves to a position P and the PN code generator 130 generates the L-n length remaining chips based on the accumulated seeds. Since the generated code is acquired by first estimating the received code, the entire signal estimation is performed on the generated code in a state in which the generated code is synchronized with the received code. A switch controller 125 controls the switch 120 on the basis of a predetermined value.

A PN code including a value generated by the PN code generator 130 (the chips in one cycle) is transferred to a determiner 150. Since the PN code is in the form of a binary stream, a converter 140 may convert the binary stream. The converter 140 converts 0 in the binary stream into 1 and 1 in the binary stream into −1 (NRZ conversion). The value converted by the converter 140 is used as an input signal of the determiner 150. The determiner 150 correlates the generated PN code with the received signal and checks the validity of the code acquisition by performing a threshold value test for the correlated value to determine whether the synchronization is normally performed. The determiner 150 correlates an input signal input to the receiver 100 with an output signal (an NRZ signal) of the converter 140 and checks the validity of the code acquisition based on whether a value (a size) of the correlated signal exceeds the predetermined threshold value.

When the code acquisition fails, the receiver 100 repeats the entire code acquisition process starting from the code accumulation again. That is, when the determiner 150 transmits a no acquisition signal to the switch controller 125, the switch 120 moves back to the position S and the entire process is then repeated again.

SE techniques in the related art have one common disadvantage. The disadvantage is that correct code acquisition is impossible when data modulation is applied to a PN code. For example, when a PN code is multiplied by a constant sequence for data modulation, a transmitted PN code has a different sequence from that of a PN code of the receiver 100. Therefore, the receiver 100 has difficulty in acquiring codes. For example, since the PN code generator 130 of FIG. 1 fails to generate a PN code having correct synchronization when a PN code is inverted, the receiver 100 finally fails to acquire a signal.

The technique described below is a technique in which a receiver normally acquires a PN code even when a PN code on which data modulation has been performed is used. In this case, the receiver may decode a signal received in the process of acquiring a PN code and extract actual data therefrom.

To this end, the receiver performs signal processing using a shift-and-add property. When the receiver performs a modulo 2 addition operation on a PN code and a constantly delayed PN code according to the shift-and-add property, a corresponding PN code is acquired equally. However, a time phase of the PN code acquired by the modulo 2 addition operation is changed. This property may be applied not only to a normal PN code but also to a PN code whose value is inverted due to data. This may be expressed as the following Equation 1.

$$\{a_k\}_{k=0}^{L-1} \oplus \{a_{k+1}\}_{k=0}^{L-1} = \{a_{k+\alpha}\}_{k=0}^{L-1}$$

$$\{\overline{a_k}\}_{k=0}^{L-1} \oplus \{\overline{a_{k+1}}\}_{k=0}^{L-1} = \{a_{k+\alpha}\}_{k=0}^{L-1} \quad \text{[Equation 1]}$$

Here, $\oplus$ denotes modulo 2 addition, and $\overline{\chi}$ denotes $-\chi$. When such a property is applied, the receiver may always acquire a desired PN code constantly regardless of whether the received code has a sign-inverted value or a normal value. Modulo 2 addition refers to an XOR operation. Therefore, a summer is implemented as an XOR gate.

Figure 2:
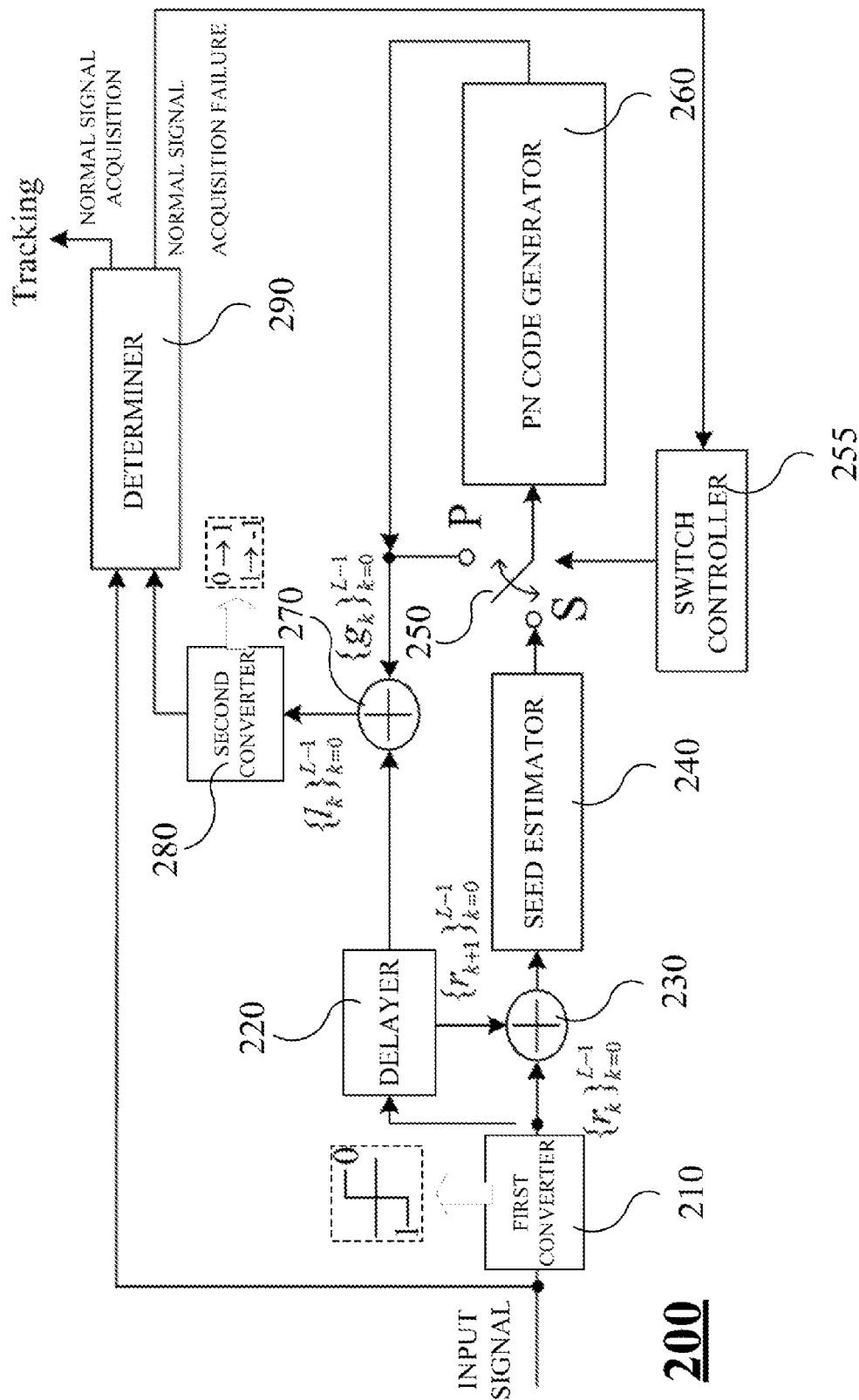
FIG. 2 illustrates another example of a receiver using the SE technique.

FIG. 2 illustrates another example of a receiver using the SE technique

A receiver 200 includes a first converter 210, a delayer 220, a seed estimator 240, a switch 250, a switch controller 255, a PN code generator 260, a second converter 280, and a determiner 290. Further, the receiver 200 includes a first summer 230 and a second summer 270, which sum two signals.

The first converter 210 converts an input signal into a return-to-zero (RZ) signal. Hereinafter, a signal output from the first converter 210 is referred to as an RZ signal. The RZ signal is represented by $\{r_k\}_{k=0}^{L-1}$. That is, the first converter 210 converts a constant pulse signal into a binary stream form. The delayer 220 constantly delays the signal output from the first converter 210. The signal delayed by the delayer 220 is referred to as a delayed signal $\{r_{k+1}\}_{k=0}^{L-1}$. A modulo 2 addition operation is performed on the RZ signal and the delayed signal. This may be expressed as the following Equation 2. The first summer 230 sums the RZ signal and the delayed signal of the RZ signal by performing modulo 2 addition as illustrated in the following Equation 2.

$$\{r_k\}_{k=0}^{L-1} \oplus \{r_{k+1}\}_{k=0}^{L-1} \quad \text{[Equation 2]}$$

Here, a PN code acquired by the above operation corresponds to the same PN code even when the RZ signal $\{r_k\}_{k=0}^{L-1}$ and the delayed signal $\{r_{k+1}\}_{k=0}^{L-1}$ of the RZ signal are received with inverted values.

A signal output from the first summer 230 is used as an input signal in the seed estimator 240. The seed estimator 240 collects n-length codes in chips (seed codes) based on the input signal. The seed estimator 240 acquires the n-length seed codes from the PN code. When the switch 250 is positioned at a position S, outputs (the seed codes) of the seed estimator 240 are accumulated on a register of the PN code generator 260. When the accumulation is completed, the switch 250 moves to a position P and the PN code generator 260 generates the L−n length remaining chips based on the accumulated seeds.

Then, the PN code generator 260 generates the remaining codes of the PN code based on the n-length seed codes as described above. The PN code generator 260 generates an L-length PN code $\{g_k\}_{k=0}^{L-1}$ including the seeds. Then, the second summer 270 sums the L-length PN code $\{g_k\}_{k=0}^{L-1}$ generated by the PN code generator 260 and the delayed signal $\{r_{k+1}\}_{k=0}^{L-1}$ obtained by the delayer 220 delaying the RZ signal by performing modulo 2 addition as illustrated in the following Equation 3.

$$\{L_k\}_{k=0}^{L-1} = \{g_k\}_{k=0}^{L-1} \oplus \{r_{k+1}\}_{k=0}^{L-1}, \quad \text{[Equation 3]}$$
$$= [(r_k)_{k=0}^{L-1} \oplus \{r_k\}_{k=0}^{L-1}] \oplus \{r_{k+1}\}_{k=0}^{L-1},$$
$$= \{r_k\}_{k=0}^{L-1}$$

Referring to Equation 3, it may be seen that a signal $\{L_k\}_{k=0}^{L-1}$ output from the second summer 270 is the same as the output signal $\{r_k\}_{k=0}^{L-1}$ of the first converter 210.

The subsequent process is the same as that described in FIG. 1. The second converter 280 converts 0 in a binary stream into 1 and 1 in the binary stream, into −1 (the NRZ conversion). The value converted by the second converter 280 is used as an input signal of the determiner 290. The determiner 290 correlates the generated PN code with the received signal and checks the validity of the code acquisition by performing a threshold value test for the correlated value to determine whether the synchronization is normally performed. When the code acquisition fails, the receiver 200 repeats the entire code acquisition process starting from the code accumulation again. That is, when the determiner 290 transmits a no acquisition signal to the switch controller 255, the switch 250 moves back to the position S and the entire process is then repeated again.

Figure 3:
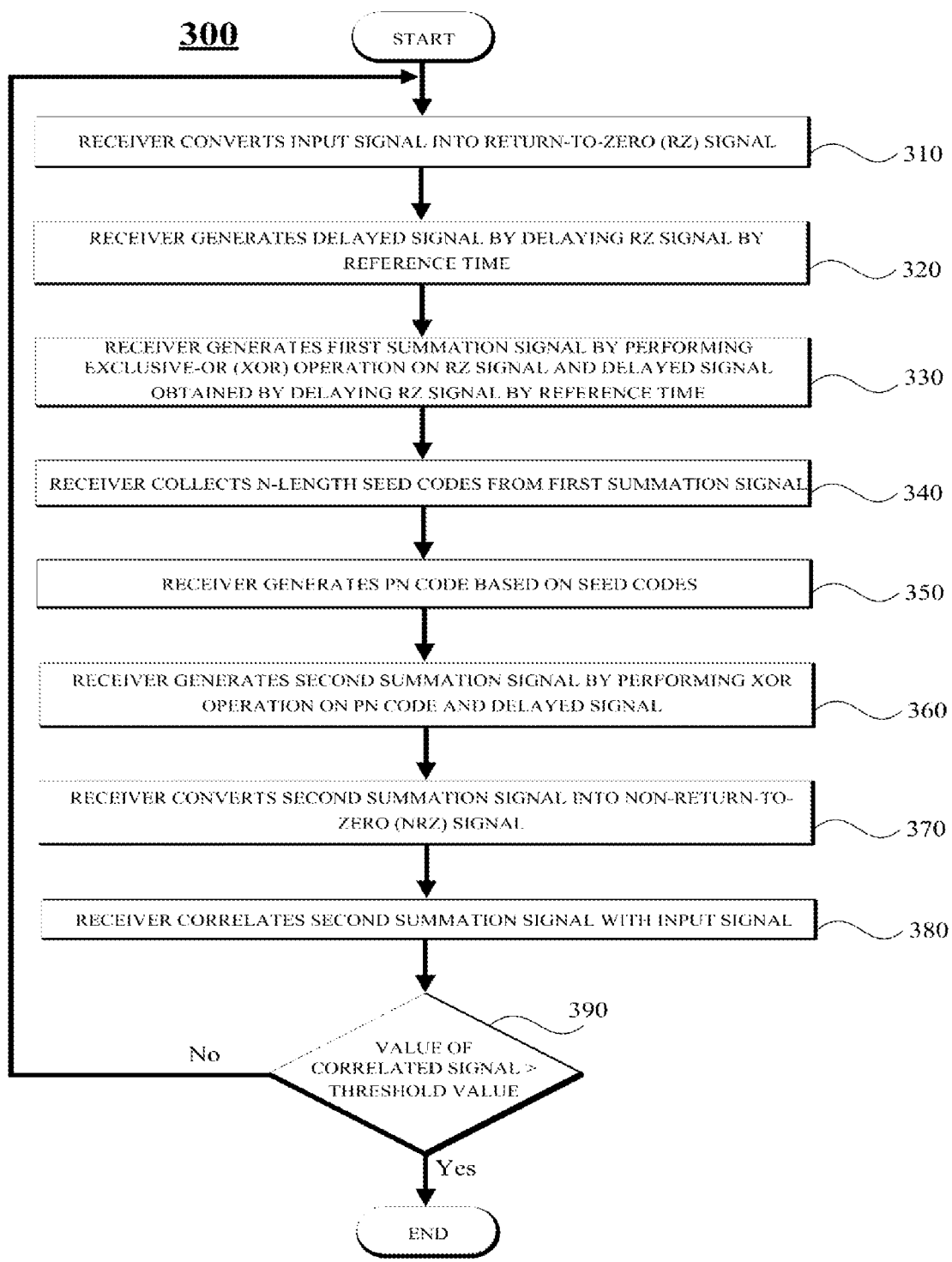
FIG. 3 illustrates an example of a flowchart for acquiring a pseudo noise (PN) code at a receiver.

FIG. 3 illustrates an example of a flowchart for a method 300 of acquiring a pseudo noise (PN) code at a receiver. The receiver of FIG. 3 may have the configuration described in FIG. 2. The receiver first converts an input signal, which is an NRZ signal, into an RZ signal (310). The receiver generates a delayed signal by delaying the RZ signal by a reference time (320). The receiver may constantly delay the RZ signal by using various circuit configurations.

The receiver generates a first summation signal by performing an XOR operation (modulo 2 addition) on the RZ signal and the delayed signal (330). The receiver collects n-length seed codes from the first summation signal (340). In this case, a length L of a PN code in one cycle is $2^n-1$ as described above. The receiver generates the L−n length remaining seed codes of the PN code based on the seed codes and finishes the entire PN code (350). The receiver generates a second summation signal by performing an XOR operation on the generated PN code and the delayed signal, which is an output signal of the delayer (360). The second summation signal becomes a signal that the receiver intends to use.

In addition, the receiver converts the second summation signal into an NRZ signal (370), and correlates the converted NRZ signal with an input signal input to the receiver (380). The receiver determines whether the correlated value (a size) exceeds a predetermined threshold value (390). When the correlated value exceeds the threshold value, the receiver determines that the synchronization is normal (normal PN code acquisition). The receiver may then perform signal tracking based on the NRZ signal. When the correlated value is less than or equal to the threshold value, the receiver may determine that the synchronization is not normal, and may perform the PN code acquisition process again from the beginning.

Figure 4:
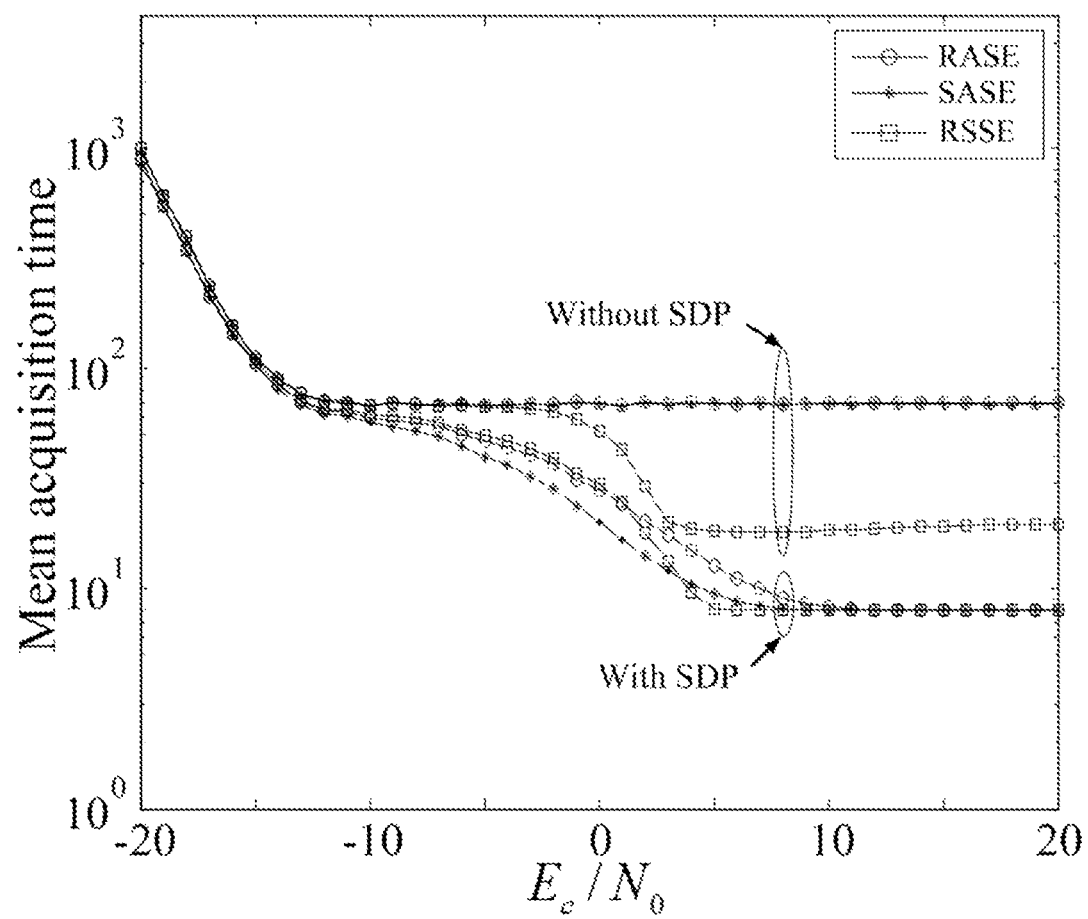
FIG. 4 illustrates an example of a graph for performance of a PN code acquisition technique.

FIG. 4 illustrates an example of a graph for performance of a PN code acquisition technique. In FIG. 4, rapid acquisition sequential estimation (RASE), seed accumulating sequential estimation (SASE), and recursive soft sequential estimation (RSSE) techniques are techniques that have been studied using a conventional SE technique. The RASE technique is a technique in which a received m-sequence is sequentially estimated by loading various received chips for a maximum length sequence (an m-sequence), which is a PN code, onto a register of a code generator. The SASE technique, which is an improved RASE technique, is a technique for increasing code chip estimation accuracy while accumulating and receiving m-sequences in various cycles. The RSSE technique is a technique for improving performance by using recursive soft-in soft-out (SISO).

FIG. 4 illustrates mean acquisition times (MATs) in the cases in which a technique of applying the shift-and-add property (SDP) of FIG. 2 (hereinafter referred to as an SDP technique) to each of the techniques is used or is not used. In a simulation for verifying the above effect, it is assumed that a probability of a false alarm is $10^{-3}$, a length of a PN code is set to 255, and an examination time $T_c$ is set to a length of eight chips. The most common additive white Gaussian noise (AWGN) is assumed as channel noise.

Referring to FIG. 4, in all of the techniques of the existing SE techniques to which the SDP is applied, the MAT is gradually increased as signal power is increased, and it may be seen that the techniques to which the SDP is applied show better code acquisition performance.

The present embodiment and the accompanying drawings in this specification are only a part of the technical scope included in the above-described technique, and all variations and specific embodiments which can be easily inferred by those skilled in the art within the technical scope included in the specification and drawings of the above-described technique may be understood as being included in the scope of the above-described technique.

What is claimed is:

1. A method of acquiring a pseudo noise (PN) code at a receiver, the method comprising:
    converting, by the receiver, an input signal into a return-to-zero (RZ) signal;
    generating, by the receiver, a first summation signal by performing an exclusive-or (XOR) operation on the RZ signal and a delayed signal obtained by delaying the RZ signal by a reference time;
    collecting, by the receiver, n-length seed codes from the first summation signal;
    generating, by the receiver, a PN code based on the seed codes; and
    generating, by the receiver, a second summation signal by performing an XOR operation on the PN code and the delayed signal.

2. The method of claim 1, wherein the receiver generates a $2^n-1$ length PN code based on the n-length seed codes using a sequential estimation (SE) technique.

3. The method of claim 1, further comprising converting, by the receiver, the second summation signal into a non-return-to-zero (NRZ) signal.

4. The method of claim 3, further comprising determining, by the receiver, whether synchronization is normally performed based on the NRZ signal.

5. A receiver for acquiring a PN code, the receiver comprising:
- a first converter configured to convert an input signal input to the receiver into an RZ signal;
- a delayer configured to generate a delayed signal by delaying the RZ signal by a reference time;
- a first summer configured to perform an XOR operation on the RZ signal and the delayed signal;
- a seed estimator configured to collect n-length seed codes from an output signal of the first summer;
- a PN code generator configured to generate a PN code based on the seed codes; and
- a second summer configured to perform an XOR operation on the delayed signal and the PN code.

6. The receiver of claim 5, wherein the PN code generator generates the $2^n-1$ length PN code based on the n-length seed codes using an SE technique.

7. The receiver of claim 5, further comprising:
- a second converter configured to convert an output signal of the second summer into an NRZ signal; and
- a determiner configured to determine whether synchronization is normally performed based on an output signal of the second converter.

8. The receiver of claim 7, the determiner correlates the output signal of the second converter with the input signal and determines whether synchronization is normally performed based on whether a value of the correlated signal exceeds a threshold value.

9. The receiver of claim 5, further comprising a switch configured to selectively transfer an output value of the seed estimator to the PN code generator or the second summer.

10. The receiver of claim 7, further comprising:
- a switch configured to selectively transfer an output value of the seed estimator to the PN code generator or the second summer; and
- a switch controller configured to control a signal transfer direction of the switch according to an output signal of the determiner.

* * * * *